United States Patent
Takahashi et al.

(10) Patent No.: US 9,897,752 B2
(45) Date of Patent: Feb. 20, 2018

(54) OPTICAL END COUPLING TYPE SILICON OPTICAL INTEGRATED CIRCUIT

(71) Applicant: Photonics Electronics Technology Research Association, Tokyo (JP)

(72) Inventors: Shigeki Takahashi, Tokyo (JP); Junichi Fujikata, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 14/780,434

(22) PCT Filed: Mar. 20, 2014

(86) PCT No.: PCT/JP2014/057780
§ 371 (c)(1),
(2) Date: Sep. 25, 2015

(87) PCT Pub. No.: WO2014/156959
PCT Pub. Date: Oct. 2, 2014

(65) Prior Publication Data
US 2016/0041338 A1    Feb. 11, 2016

(30) Foreign Application Priority Data

Mar. 25, 2013 (JP) .................... 2013-061876

(51) Int. Cl.
*G02B 6/26* (2006.01)
*G02B 6/122* (2006.01)
(Continued)

(52) U.S. Cl.
CPC ........... *G02B 6/1228* (2013.01); *G02B 6/122* (2013.01); *G02B 6/14* (2013.01); *G02B 6/2813* (2013.01); *G02B 6/305* (2013.01)

(58) Field of Classification Search
None
See application file for complete search history.

(56) References Cited

U.S. PATENT DOCUMENTS 6,163,632 A    12/2000  Rickman et al.
6,385,375 B1 *  5/2002  Goto .................... G02B 6/4246
                                              385/49
(Continued)

FOREIGN PATENT DOCUMENTS

GB    2367377 A    4/2002
JP    H11-103126 A    4/1999
(Continued)

OTHER PUBLICATIONS

Extended Search Report issued in European Patent Application No. 14773100.4, dated Dec. 23, 2016.
(Continued)

*Primary Examiner* — Chris Chu
(74) *Attorney, Agent, or Firm* — Michael Best & Friedrich LLP

(57) ABSTRACT

An optical end coupling type silicon optical integrated circuit is provided using an SOI substrate. This optical integrated circuit is constituted so as to connect with an external optical circuit at an end coupling part and have signal light incident to an optical circuit that includes a curved part. In the plane of the optical integrated circuit, the position of one end coupling part selected from among any thereof and the position of any multimode optical waveguide element to which a respective optical waveguide is connected via a respective curved part satisfy a positional relationship defined on the basis of a beam divergence angle [theta] of stray light.

12 Claims, 13 Drawing Sheets

(51) Int. Cl.
*G02B 6/28* (2006.01)
*G02B 6/14* (2006.01)
*G02B 6/30* (2006.01)

(56) References Cited

U.S. PATENT DOCUMENTS

| | | | |
|---|---|---|---|
| 2001/0033716 A1* | 10/2001 | Fukutomi | G02B 6/12 |
| | | | 385/49 |
| 2002/0154863 A1 | 10/2002 | Mizuno et al. | |
| 2003/0123783 A1* | 7/2003 | Miyata | G02B 6/12 |
| | | | 385/15 |
| 2004/0234199 A1* | 11/2004 | Melloni | G02B 6/125 |
| | | | 385/32 |
| 2006/0204175 A1 | 9/2006 | Laurent-Lund et al. | |
| 2010/0067846 A1 | 3/2010 | Tokushima | |
| 2010/0321952 A1* | 12/2010 | Coleman | F21S 8/04 |
| | | | 362/607 |
| 2013/0336652 A1* | 12/2013 | Ogawa | H04B 10/07 |
| | | | 398/38 |

FOREIGN PATENT DOCUMENTS

| | | |
|---|---|---|
| JP | H11-191656 A | 7/1999 |
| JP | 2000-347231 A | 12/2000 |
| JP | 2001-051144 A | 2/2001 |
| JP | 2001-517779 A | 10/2001 |
| JP | 2002-162528 A | 6/2002 |
| JP | 2005-331614 A | 12/2005 |
| JP | 2008-145734 A | 6/2008 |
| WO | WO-2008/066160 A1 | 6/2008 |

OTHER PUBLICATIONS

Thierry Pinguet et al., "25 Gb/s Silicon Photonic Transceivers", 2012 IEEE 9th International Conference on Group IV Photonics (GFP), ThC1, Aug. 29-31, 2012, pp. 189-191 (3 sheets), IEEE, USA.

Yutaka Urino et al., "First demonstration of high density optical interconnects integrated with lasers, optical modulators, and photodetectors on single silicon substrate", Optics Express, vol. 19, Issue 26 (https://www.osapublishing.org/oe/fulltext.cfm?uri=oe-19-26-B159&id=224464), Dec. 12, 2011, pp. B159-B165 (7 sheets), Optical Society of America, USA.

International Search Report issued in Application No. PCT/JP2014/057780, dated Jun. 10, 2014.

* cited by examiner

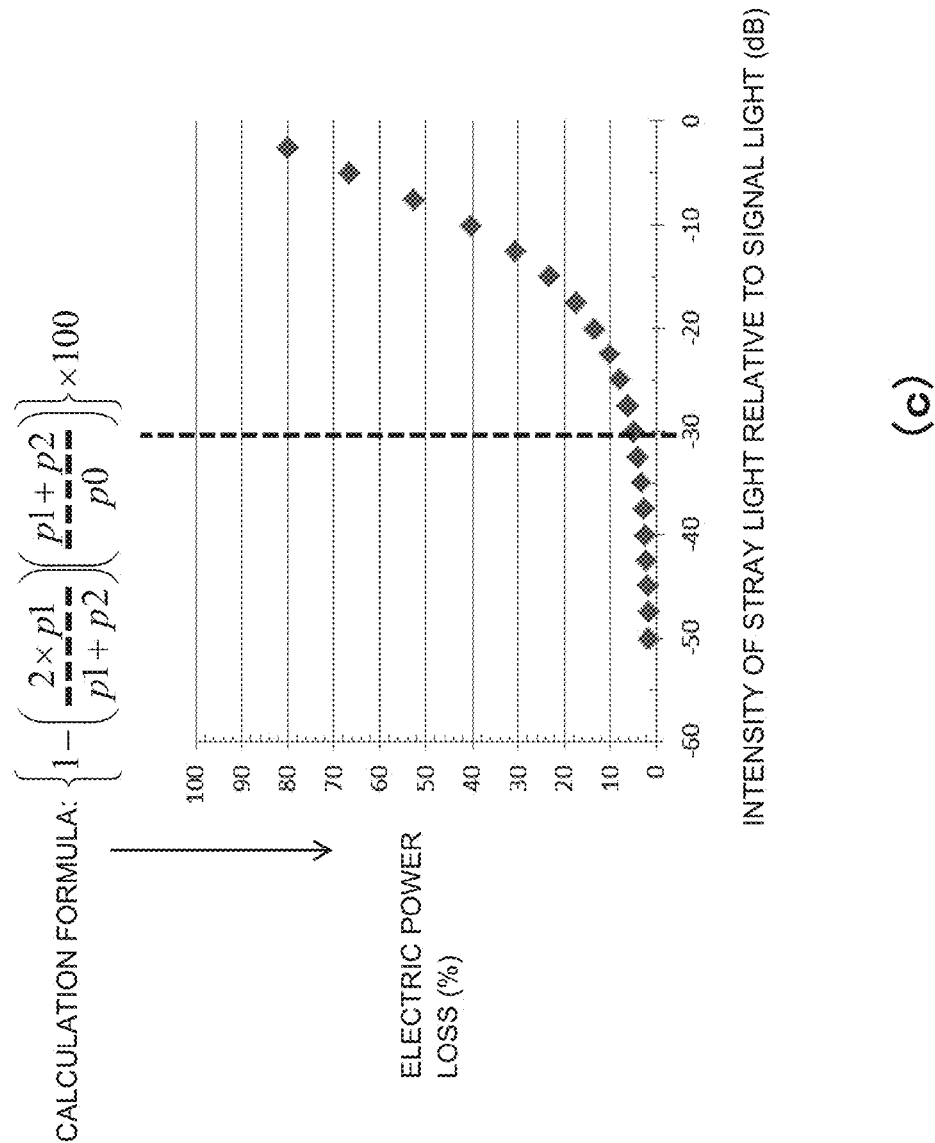

Fig. 4
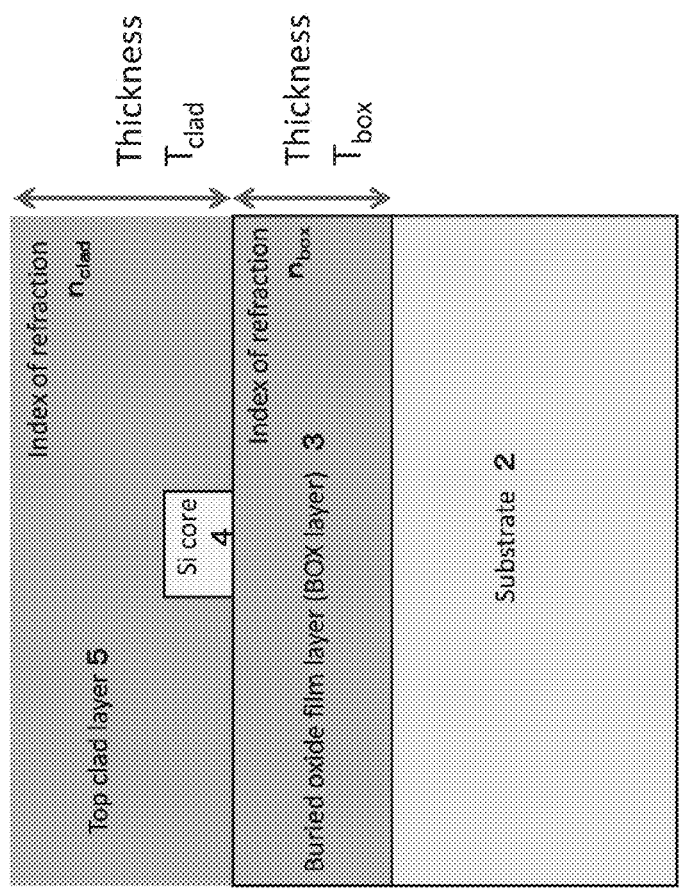
(b)
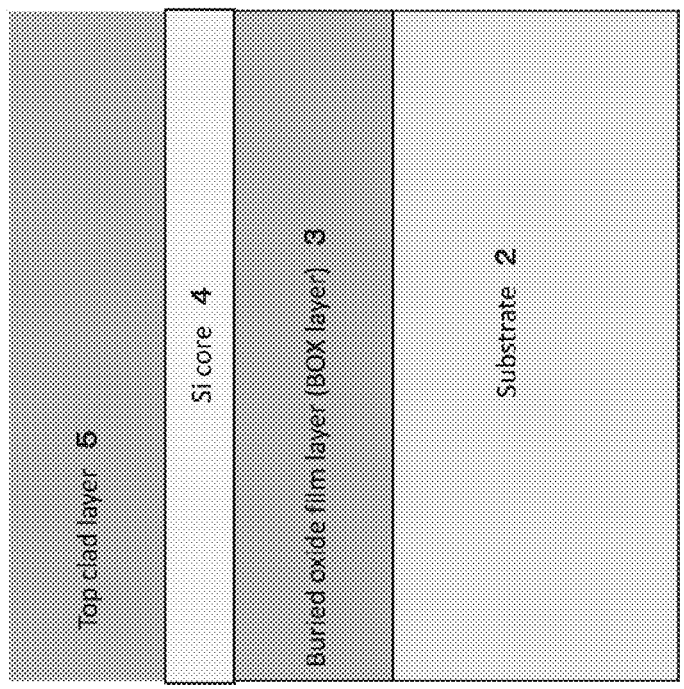
(a)

OPTICAL END COUPLING TYPE SILICON OPTICAL INTEGRATED CIRCUIT

TECHNICAL FIELD

The present invention relates to an end-surface optical-coupling-type silicon optical integrated circuit; and, more specifically, the present invention relates to, in a silicon photonics technique, an optical integrated circuit that minimizes effect of stray light that is generated when an external optical circuit is optically coupled by carrying out end-surface coupling.

BACKGROUND ART

Recently, a method based on a silicon (Si) processing technique for manufacturing an element for optical communication (i.e., a silicon photonics technique) is attracting attention; and technological development relating thereto has been actively carried out. In the silicon photonics technique, an optical integrated circuit is realized by combining minute optical elements and integrating them on a single substrate. More specifically, an optical integrated circuit is formed by integrating optical elements such as a multimode optical waveguide element, an optical switch, an optical modulator and so on by using optical waveguides formed on the substrate.

Some optical integrated circuits are made based on silicon-on-insulator (SOI) substrates, quartz-based PLCs (Planar Lightwave Circuit), and so on. A SOI substrate is a laminated substrate that is made by forming a silicon dioxide film, that is referred to as $SiO_2$ buried oxide film (a so-called BOX layer), on a substrate such as a silicon substrate, and forming thereon a silicon film that is referred to as a silicon active layer. By processing the silicon active layer to shape it to be a narrow line, and forming a top clad layer having an index of refraction lower than that of Si, an optical waveguide, that comprises the silicon as a core and the BOX layer and the top clad layer as clad parts, can be formed. Note that, in the case that a quartz-based PLC is to be used, the core made of the silicon is also buried by the silicon dioxide.

Many of the optical elements of the optical integrated circuit are waveguide-type elements that can be easily miniaturized. Also, the most basic optical element is an optical waveguide; and the optical waveguides comprise a linear waveguide, a curved waveguide, a branching waveguide, and so on.

In the above silicon photonics technique, in general, a size of a cross section of signal light passing through an optical waveguide is less than 1 µm square. On the other hand, for example, in the case that a standard optical fiber for communication is set to be an external optical circuit, a diameter of signal light is equal to or more than 10 µm square; thus, a difference of 10 to 100 times in the beam diameters may be anticipated. That is, in the silicon photonics technique, a construction of a coupling part, such as how coupling between a silicon optical waveguide and an external optical circuit is realized, becomes a very important matter.

There is a technique to realize the above, wherein signal light is inputted from an upper plane or a lower plane of a plane of an optical integrated circuit by use of a grating coupler (refer to Non-patent-related Document 1). Also, in addition to the above, there is another technique to realize the above, wherein a coupling part is formed by use of an optical element such as a spot size converter (SSC), and the light is made to be entered substantially in parallel with a plane of the optical integrated circuit by carrying out end-surface coupling to optically couple an external optical circuit to a chip-end surface of an optical integrated circuit (refer to Patent-related Document 1). For example, in the case of a spot size converter, by making it to have a construction for coupling it with an end-surface of an external optical circuit and gradually reducing the width of the optical waveguide, it becomes possible to enhance integrity of an optical mode field with the external circuit. As a result, it becomes possible to optically couple signal light directly from an external optical circuit to input it into an optical waveguide.

FIG. 1 is a schematic diagram showing arrangement of a prior-art optical integrated circuit that uses a spot size converter such as that explained above (refer to Non-patent-related Document 2 also). As shown in the figure, in an optical integrated circuit 1, one end (end-surface coupling part 15) of a spot size converter 10 is connected to an external optical circuit 20 (here, it is supposed that this is a semiconductor laser), and another end is connected to an optical waveguide 30. Signal light entered, by optical coupling, from the external optical circuit 20 propagates through the optical waveguide 30 via the spot size converter 10, and the signal light is coupled to a multimode optical waveguide element 40 (here, it is supposed that this is a MMI coupler). Next, each part of the signal light, that is formed by dividing the signal light by the multimode optical waveguide element 40, propagates through a wide-width optical waveguide 50 (here, this is a multimode optical waveguide element that is made to have a wide waveguide width to reduce a propagation loss) via an optical waveguide 45, and the part of the signal light is inputted to an optical element such as an optical modulator 60. Further, the modulated light outputted therefrom is coupled to another optical element via an optical waveguide.

Note that an optical integrated circuit such as that shown in FIG. 1 can be formed to be in the shape of a square and to have a plane size such that each side of the square has a length of approximately 5 mm.

CITATION LIST

Patent-Related Documents

Patent-related Document 1: PCT pamphlet No. WO2008/066160

Non-Patent-Related Documents

Non-patent-related Document 1: Thierry Pinguet et al., "25 Gb/s Silicon Photonic Transceivers," 2012 IEEE 9th International Conference on Group IV Photonics (GFP), ThC1, pp. 189-191

Non-patent-related Document 2: "First demonstration of high density optical interconnects integrated with lasers, optical modulators, and photodetectors on single silicon substrate," OPTICS EXPRESS, Vol. 19, No. 26, Dec. 12, 2011, B159-B165

SUMMARY OF INVENTION

Technical Problem

As a result of study by the inventors of the present invention, it is found in the optical integrated circuit 1 explained above that, in the case that end-surface coupling is carried out by use of the spot size converter 10 to couple to the external optical circuit 20, a large amount of stray light 80 is generated at the end-surface coupling part 15, and the stray light propagates through the clad as a result that the stray light is confined within the clad and reflected therein; and this may exert bad influences on other elements of the optical integrated circuit and devices.

More specifically, in the case that an optical integrated circuit using a SOI substrate is adopted, a difference between an index of refraction of light in the substrate and an index of refraction of light in the clad material becomes large. In such a case, the generated stray light 80, that is in a state that it has been confined within the clad, would propagate for a long distance that is longer than sizes of circuit elements, with a characteristic distribution of intensity. In this regard, it is found according to numerical calculation carried out by the inventors that, in the case that the stray light, that has been generated at the end-surface coupling part and is in the state that it has been confined in the clad, propagates through the optical waveguide 30 while it is iteratively reflected within the clad and, then, is coupled to the multimode optical waveguide element 40, and that even if the light intensity of the stray light 80 in the multimode optical waveguide element 40 is small, such as −30 db with respect to the signal light, the stray light exerts unintended bad influences on the multimode optical waveguide element 40, that is, it deteriorates the element characteristic as a result that the stray light is coupled to the multimode optical waveguide element 40 while it is iteratively reflected.

In the following, problems relating to the stray light will be further explained with reference to FIG. 2 and FIG. 3.

In FIG. 2, it is assumed that a MMI coupler is adopted as the multimode optical waveguide element 40. Signal light $P_0$ is inputted into the MMI coupler, signal light $P_1$ and signal light $P_2$ are outputted toward the optical waveguide 45. Here, it is supposed that the stray light 80 slips into the MMI coupler at its starting point, and the stray light is coupled as a higher order mode with the worst phase condition. A reason that the worst phase condition is considered is that, in general, the phase of the stray light easily changes due to an error in processing of the optical integrated circuit, a positional error in implementation of the external optical integrated circuit 200, and so on and, thus, it is difficult to control the phase of the stray light. In the following, the intensities of the signal light $P_0$, $P_1$, and $P_2$ will be represented by p0, p1, and p2, respectively.

Under the above assumption, graphs of (a)-(c) of FIG. 3 will be referred to. (a)-(c) of FIG. 3 show a branching ratio, an optical loss of a coupler (dB), and an electrical loss (%) in connection with relative intensity of the stray light in relation to the signal light (the horizontal axis), respectively. As can be seen from each graph, by setting the value approximately −30 dB in the relative intensity of the stray light in relation to the signal light to be a reference, each characteristic can be extracted. That is, it can be seen from (a) of FIG. 3 that the branching ratio drastically becomes smaller than 1, and drift in branching occurs as the relative intensity of the stray light becomes larger; it can be seen from (b) of FIG. 3 that the optical loss in the MMI coupler drastically increases as the relative intensity of the stray light becomes larger; and it can be seen from (c) of FIG. 3 that the electrical loss drastically increases as the relative intensity of the stray light becomes larger. Note that the values of the vertical axes of (a)-(c) of FIG. 3 are calculated by using the calculation formulas shown beside the vertical axes; and, regarding the electrical loss of (c) of FIG. 3, it is calculated by use of the calculation formula in which an optical loss of the MMI coupler is applied to an electrical loss, since optical energy corresponding to a difference between p1 and p2 represents the electrical loss.

Note that the problem of stray light as explained above does not become a special problem in an optical integrated circuit that uses a quartz-based PLC. This is because the intensity of stray light attenuates sufficiently, i.e., attenuates 30 dB or more, at a point that is separated 1 mm or more from an end-surface coupling part. More specifically, in an optical integrated circuit that uses a quartz-based PLC, a chip size is about several square centimeters, and the size in a spot size converter and a bend radius of an optical waveguide are more than 1 mm; thus, a multimode optical waveguide element is separated more than approximately 1 mm from an end-surface coupling part, and the intensity of stray light attenuates 30 dB or more, without requiring to take any measures.

On the other hand, in a silicon optical integrated circuit that uses a SOI substrate, a thickness of a $SiO_2$ layer is 5 to 10 times thinner than that of a quartz-based PLC; thus, even if stray light propagates within a clad for a long distance, it will not be radiated; this is because field strength is sufficiently small. Also, especially, in a silicon optical integrated circuit, since a chip size is approximately several square millimeters, and a bend radius of an optical waveguide and a spot size converter are made small to have sizes of about several micrometers and 100 micrometers respectively, the problems explained above do not become apparent.

Accordingly, an object of the present invention is to deal with, with efficiency and at low costs, stray light that is generated when an optical integrated circuit according to a SOI substrate is optically coupled to an external optical circuit by carrying out end-surface coupling as explained above. Thus, in a silicon optical integrated circuit of an end-surface optical coupling type of the present invention, in a plane of the circuit, a position to place a multimode optical waveguide element relative to a position of an end-surface coupling part, that is constructed by use of a spot size converter, is set within an appropriate placing area determined by specific formulas; and the end-surface coupling part and the multimode optical waveguide element are connected via an optical waveguide including a curved part.

Solution to Problem

For solving the above problems, the present invention provides a silicon optical integrated circuit of an end-surface optical coupling type that is characterized by an appropriate positional relationship to place optical elements.

An embodiment of a silicon optical integrated circuit of an end-surface optical coupling type of the present invention is formed based on a $SiO_2$ buried oxide film layer stacked on a substrate in a laminating manner, a Si core layer stacked on the $SiO_2$ buried oxide film layer in a laminating manner, and a top clad layer stacked on the Si core layer in a laminating manner and having an index of refraction lower than that of Si. Further, the end-surface optical-coupling-type silicon optical integrated circuit is characterized in that it is constructed in such a manner that it is connected to an external optical circuit at each of one or more end-surface coupling parts, and signal light is inputted to each of one or more optical waveguides that include curved parts; and that, on a plane of the optical integrated circuit, a position of an end-surface coupling part selected from arbitrary ones and a position of an arbitrary multimode optical waveguide element to which each optical waveguide is coupled via each curved part have a predetermined positional relationship based on a beam divergence angle θ of stray light that is repeatedly reflected by a bottom surface of the SiO$_2$ buried oxide film layer and a top surface of the top clad layer and propagates therebetween.

Further, in the end-surface optical-coupling-type silicon optical integrated circuit, each end-surface coupling part is formed by use of a spot size converter, and the spot size converter is coupled to an external optical circuit and an optical waveguide respectively. Still further, in the end-surface optical-coupling-type silicon optical integrated circuit, a position at which bending of a curved part of at least one optical waveguide on the plane of the optical integrated circuit starts is located on a point on a line of a waveguiding direction of the signal light at a corresponding end-surface coupling part; and the point is determined by selecting a point, where intensity of the stray light is low, from a stray light distribution in the stray light intensity.

In addition, the end-surface optical-coupling-type silicon optical integrated circuit is characterized in that at least one multimode optical waveguide element is placed within a range of a predetermined allowable distance from an end-surface coupling part, wherein the range is defined in connection with intensity of the signal light.

Another embodiment of end-surface optical-coupling-type silicon optical integrated circuit of a multichannel type of the present invention comprises: n (n≥2) optical waveguides that include curved parts respectively; n spot size converters coupled to one ends of the optical waveguides, wherein end-surface coupling is carried out to couple the n spot size converters respectively to an external optical circuit for optically coupling signal light from the external optical circuit and inputting it into the optical waveguide; and n multimode optical waveguide elements coupled to other ends of the optical waveguides respectively. It is characterized in that, on a plane of the optical integrated circuit, each of the n multimode optical waveguide elements is placed within a placing area that is determined based on m areas that are determined, based on a beam divergence angle θ of stray light and a predetermined distance r, for respective positions of m arbitrary spot size converters selected from n spot size converters and respective positions of corresponding multimode optical waveguide elements.

Advantageous Effects of Invention

By the SOI-substrate-based end-surface optical-coupling-type silicon optical integrated circuit of the present invention, stray light, that is in a state that it is confined within a clad and propagates for a long distance with a characteristic distribution, can be dealt with by use of a small circuit area; and deterioration of element characteristic, that is due to the stray light coupled to the multimode optical waveguide element 40 by reflection, can be prevented. In the construction, existing optical elements can be used for the respective optical elements of the construction, and it is not necessary to take any special measure regarding the optical elements, such as a measure to provide a special function with an optical element to deal with influence of the stray light; thus, it becomes possible to take measures, at low costs and with efficiency, to deal with the stray light.

BRIEF DESCRIPTION OF DRAWINGS

FIG. 4 shows cross sectional views of a SOI-substrate-based silicon optical integrated circuit according to the present invention.

DESCRIPTION OF EMBODIMENTS

Figure 1:
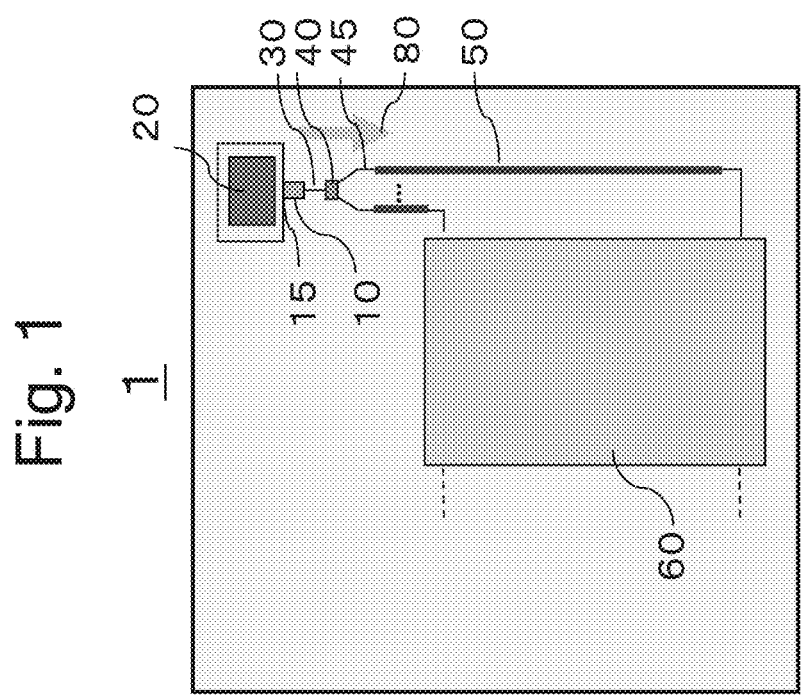
FIG. 1 is a diagrammatic schematic diagram showing an example of arrangement of an optical integrated circuit according to a prior art technique.

End-surface optical-coupling-type silicon optical integrated circuits (optical integrated circuits) 1' and 1" according to the embodiments of the present invention will be explained with reference to the figures.

With reference to FIG. 4, thus, with reference to cross sectional views, the construction of the silicon optical integrated circuit will be explained again. As can be seen from (a) of FIG. 4, the optical integrated circuits 1' and 1" according to respective embodiments of the present invention is formed based on a SiO$_2$ buried oxide film layer (BOX layer) 3 stacked on a circuit substrate 2 in a laminating manner, a Si core (silicon active) layer 4 stacked on the SiO$_2$ buried oxide film layer 3 in a laminating manner, and a top clad layer 5 stacked on the Si core layer 4 in a laminating manner and having an index of refraction lower than that of Si; that is, the optical integrated circuit is formed as an optical integrated circuit based on the above explained SOI substrate. Regarding the top clad layer, any material that has an index of refraction lower than that of Si can be used as the material of the top clad layer; thus, for example, SiON, SiN, or the like can be used in place of $SiO_2$. (b) of FIG. 4 is an additional cross sectional view that is a view viewed from a side of (a) of FIG. 4. As shown in the figure, it can be seen that the Si core has the shape of a narrow line. In this regard, note that the shape of the Si core is not limited to the above shape; thus, in addition to the narrow line shape of FIG. 4, a shape such as a rib shape may be adopted.

As will be explained later, in the parameters of the construction explained above, "$n_{box}$" denotes an index of refraction of light of the $SiO_2$ buried oxide film layer, "$n_{clad}$" denotes an index of refraction of light of the top clad layer, "$T_{box}$" denotes a thickness of the $SiO_2$ buried oxide film layer, and "$T_{clad}$" denotes a thickness of the top clad. Note that, as shown in the figure, the "$T_{clad}$" is a thickness at a part where the top clad contacts with the $SiO_2$ buried oxide film layer.

Also, in the present invention, although it is assumed that the external optical circuit 20 comprises a semiconductor laser or an optical fiber in general, the construction is not limited thereto. For example, in addition to the above, the external optical circuit 20 can be constructed by providing a mechanism that can concentrate input light on an end surface by use of a lens. That is, for an external optical circuit, any construction, that is able to carry out end-surface coupling at an end-surface coupling part of an optical integrated circuit and optically couple signal light from the external optical circuit to the end-surface coupling part directly, can be adopted.

Further, in the optical integrated circuit 1' according to each embodiment of the present invention, the end-surface part is constructed by use of a spot size converter, and is connected to an external optical circuit and an optical waveguide. In addition, the optical waveguide includes a curved waveguide (a curved part); and, by use of this, the spot size converter and the multimode optical waveguide element are coupled.

That is, it should be understood by a person skilled in the art that the optical integrated circuit 1' according to each embodiment of the present invention can be any optical integrated circuit if it comprises a silicon optical integrated circuit comprising a spot size converter and a multimode optical waveguide element and an optical waveguide therebetween; and that the optical integrated circuit 1' is not limited by other optical elements such as the wide-width optical waveguide 50, the optical converter 60 of FIG. 1 that were explained previously as prior-art techniques, and so on.

Figure 5:
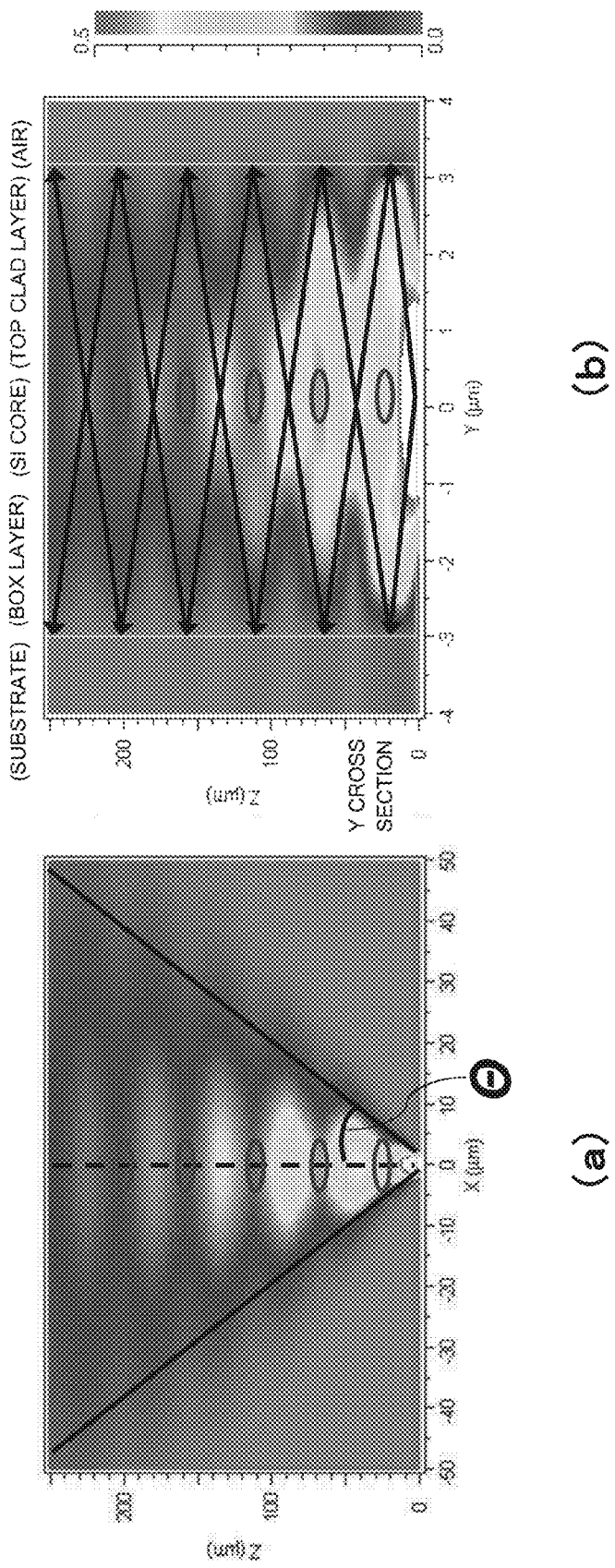
FIG. 5 shows diagrams of measurement results of simulations of electromagnetic field propagation that show appearance of radiation of the stray light in respective embodiments of the optical integrated circuit of the present invention.

FIG. 5 shows a result of measurement (the amplitude strength of an electric field) in an electromagnetic field propagation simulation that shows a manner that stray light generated at the end-surface coupling part 15 is radiated, in an arrangement of an optical integrated circuit such as that of FIG. 1 explained above. Here, it is assumed that a source that generated the stray light is a Gaussian beam having a diameter of approximately 3 micrometers, and that the Gaussian beam is made to be entered into the center of the upper clad layer and the $SiO_2$ buried oxide film layer. Note that, in each of (A) and (b) of FIG. 5, the vertical axis represents the direction of propagation of the stray light in a plane of the optical integrated circuit (a z-axis in this case). Also, the horizontal axis of (a) of FIG. 5 represents a direction that is orthogonal to the z direction, i.e., the direction of the coupling end-surface (a x-direction), and the horizontal axis of (b) of FIG. 5 represents a vertical direction with respect to the plane of the optical integrated circuit (a y-direction).

As can be considered from (a) and (b) of FIG. 5, some characteristics are extracted from radiation of the stray light. Especially, from (a) of FIG. 5, it can be observed that, in the plane of the optical integrated circuit (the x-z plane), (i) the stray light has a specific beam divergence angle θ, and (ii) specific points where the amounts of stray light decrease exist in the z-axis direction (a plurality of the elliptical areas shown in (a) of FIG. 5). Accordingly, these characteristics will be further studied.

(i) The specific beam divergence angle θ will be studied. If it is supposed that a beam spot size at a coupling end-surface (here, a width between two points where electric field amplitudes thereof in the x direction become 1/e of the value of a central peak, respectively) is "w," the "specific beam divergence angle θ" can be represented, by use of paraxial approximation, by the following formula.

[Formula 1]

$$\theta \approx \arcsin(\lambda/(\lambda^2 + (\pi^2 n^2 w^2)/4)^{1/2}) \quad (1)$$

(Here, "λ" denotes a wavelength of the inputted Gaussian beam in a vacuum, and "n" denotes an index of refraction of light of a medium through which the Gaussian beam propagates.)

Note that, in a SOI substrate, if the material of the top clad layer is $SiO_2$ that is the same as the material of the $SiO_2$ buried oxide film layer, "n" is the index of refraction of light of $SiO_2$; however, if the material of the top clad layer is not $SiO_2$ (namely, the material of the top clad layer differs from that of the $SiO_2$ buried oxide film layer), "n" can be calculated as a volume average value of both of the indexes of refraction of light as shown below.

$$n \approx (n_{box} T_{box} + n_{clad} T_{clad})/(T_{box} + T_{clad}) \quad \text{[Formula 2]}$$

(As explained above, "$n_{box}$" denotes an index of refraction of light of the $SiO_2$ buried oxide film layer, "$n_{clad}$" denotes an index of refraction of light of the top clad layer, "$T_{box}$" denotes a thickness of the $SiO_2$ buried oxide film layer, and "$T_{clad}$" denotes a thickness of the top clad.)

Here, it is supposed that w=3 μm, and $n_{box}$=1.46, and if these values and typical values such as λ=1.3 μm, $T_{box}$=3 μm, $T_{clad}$=3.18 μm, and $n_{box}$=$n_{clad}$=1.46, are substituted in above formula (1), it is calculated that θ=10.7 (degrees). Note that "λ" is a wavelength of the stray light in a vacuum, if it is strictly defined; however, in the optical integrated circuit 1' using the SOI substrate, "λ" is substantially the same as the wavelength of the signal light that is made to be entered into the spot size converter and the optical waveguide by optical coupling.

Note that the end-surface coupling part in (a) of FIG. 5 is positioned at (x, z)=(0 μm, 2 μm).

(ii) Next, each of the specific points where the amount of stray light decreases will be studied with reference to (a) and (b) of FIG. 5. Each of the elliptical areas shown in (a) and (b) of FIG. 5 is a point in a distribution of stray light intensity in the z direction (i.e., a waveguiding direction of the signal light at the coupling part) at which the stray light intensity is small.

In the case of (a) of FIG. 5, places near Z=21 μm, 68 μm, 111 μm, 159 μm, and 202 μm correspond to those points.

In (b) of FIG. 5, the optical integrated circuit 1' comprises the circuit substrate 2, the $SiO_2$ buried oxide film layer (BOX layer) 3, the Si core layer 4, the top clad layer 5, and the air stacked in this order from the small-number-side of the horizontal axis (y axis). Also, as shown by arrows, the stray light generated at the coupling end-surface 15 is repeatedly reflected by a bottom surface of the $SiO_2$ buried oxide film layer 3 and a top surface of the top clad layer 5 and propagates a space therebetween. The intensity of the stray light becomes large at the parts of the reflection paths of the stray light, and the intensity of the stray light becomes small at the parts that are not included in the reflection paths of the stray light. In this manner, the distribution of the stray light intensity on the y-z plane is formed; thus, it can be observed that there are plural points on the z axis where the stray light intensity is weak.

In the following, based on the above observation, and regarding the optical integrated circuit of the present invention, embodiments relating to appropriate positional relationships between multimode optical waveguide elements and coupling end-surface figures (or spot size converters) will be explained; wherein the multimode optical waveguide element is placed on a plane of the optical integrated circuit by use of an optical waveguide including a curved part. Note that, in the embodiments described below, it is considered that a position of a coupling end-surface and that of a spot size converter represent, in their meanings, the same matter.

First Embodiment

Figure 6:
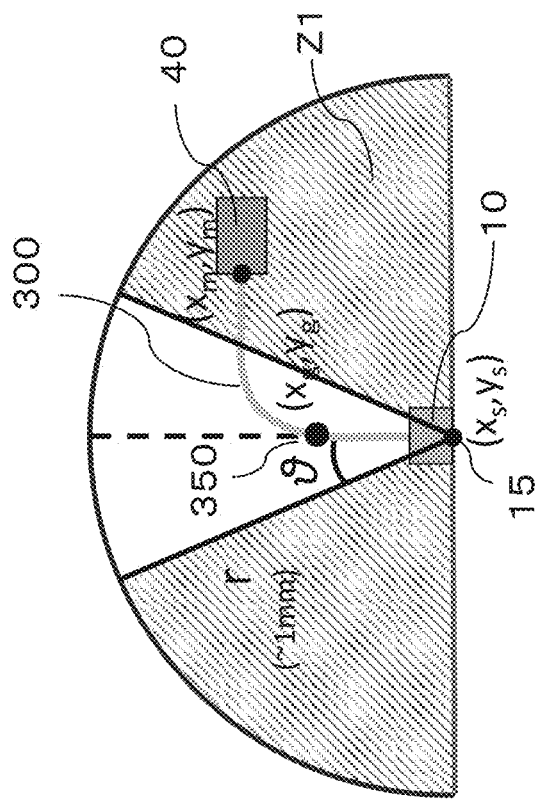
FIG. 6 is a schematic diagram showing placing areas for appropriately placing a multimode optical waveguide element in connection with a position of a spot size converter, in an optical integrated circuit according to a first embodiment of the present invention.

FIG. 6 is a schematic diagram that shows a placing area Z1 for appropriately placing a multimode optical waveguide element in connection with the coupling end-surface 15 or the spot size converter 10, in an optical integrated circuit of a first embodiment of the present invention. Here, on a plane of the optical integrated circuit (an x-y coordinate), a position of the spot size converter 10 is represented by $(x_s, y_s)$, and a position of the multimode optical waveguide element 40 is represented by $(x_m, y_m)$.

As explained above, the "beam divergence angle θ" can be calculated based on above formula (1). An area within the beam divergence angle θ in a waveguiding direction of signal light at the spot size converter 10 (an y axis direction in this case) is an area in which stray light generated from the end-surface coupling part 15 is reflected repeatedly and propagates therein to thereby exert bad influences. That is, an angle larger than the beam divergence angle θ is an allowable angle, and the multimode optical waveguide element 40 is placed on a place along an angular direction within a range of allowable angles.

Although it is needless to state, note that the multimode optical waveguide element 40 may be a MMI coupler element for dividing the entering light, or a multimode optical waveguide for guiding waves of the entering light with low optical loss.

It can be understood that, when the beam divergence angle θ such as that as shown in FIG. 6 is considered, the relationship of coordinates of the position of the spot size converter 10 $(x_s, y_s)$ and the position of the multimode optical waveguide element 40 $(x_m, y_m)$ can be represented as follows.

[Formula 3]

$$|x_m - x_s| > |y_m - y_s| \tan \theta \quad (2)$$

Figure 7:
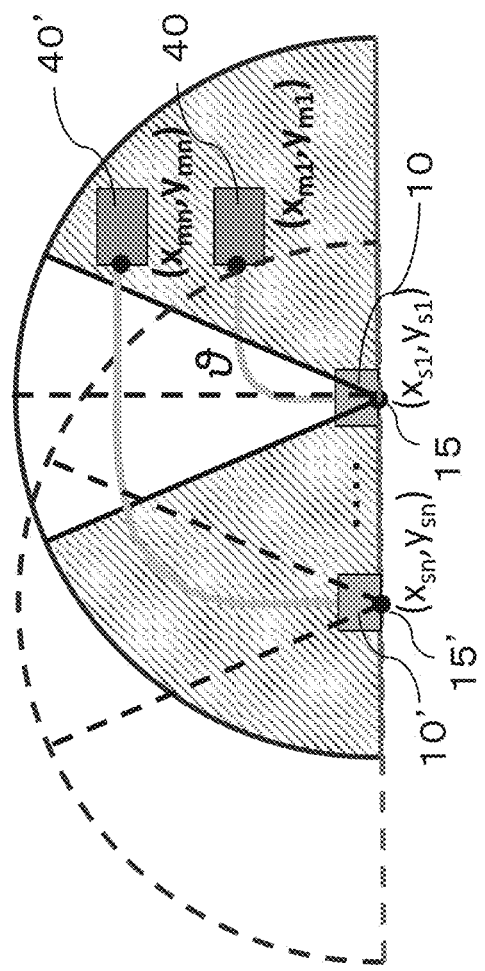
FIG. 7 is a schematic diagram showing placing areas for appropriately placing multimode optical waveguide elements in connection with a position of a spot size converter, in the case that the optical integrated circuit according to the first embodiment of the present invention is a multichannel-type optical integrated circuit.

In the above explanation that is based on FIG. 6, a single channel is considered for simplicity. On the other hand, a positional relationship in the case that the single channel type is expanded to a multichannel (n channels) type will be explained with reference to FIG. 7. On the plane of the optical integrated circuit, positions of n spot size converters 10 (10') (these are also positions of the end-surface coupling parts 15 (15')) are represented by $(x_{s1}, y_{s1}), \ldots, (x_{sn}, y_{sn})$, and positions of n multimode optical waveguide elements 40 (40') are represented by $(x_{m1}, y_{m1}), \ldots, (x_{mn}, y_{mn})$. In FIG. 6 and FIG. 7, the positions of the multimode optical waveguide elements are defined to be the coordinates of connection points connected from optical waveguides. However, in the present invention, it is considered that the positions of the multimode optical waveguide elements refer to all of the positions in the multimode optical waveguide elements.

In the case of a multi-channel type such as that shown in FIG. 7, with respect to a position of an end-surface coupling part selected from arbitrary ones (in this case, $(x_{s1}, y_{s1})$), positions of multimode optical waveguide elements to which optical waveguides are connected respectively via their curved parts should satisfy relationships shown by above formulas (1) and (2).

Specifically, within the scope of the following, $$|x_{m1} - x_{s1}| > |y_{m1} - y_{s1}| \tan \theta \quad \text{[Formula 4]}$$

that is defined by the first channel, the position of the n-th cannel's multimode optical waveguide element $(x_{m1}, y_{mn})$ should be located. Also, the following relationship, $$|x_{mn} - x_{s1}| > |y_{mn} - y_{s1}| \tan \theta \quad \text{[Formula 5]}$$

should be satisfied.

Here, FIG. 6 is referred to again. Further, in addition to the above, it is preferable to place the multimode optical waveguide element 40 within a range of predetermined allowable distance (r) from the end-surface coupling part 15 (the spot size converter 10). This is because the optical integrated circuit of the present invention has a plane size such that each side thereof typically has a length of approximately 5 mm as explained above, and, from a point of view that takes the size of the chip area into consideration, it is not desirable to place the multimode optical waveguide 40 on a place unreasonably distant from the end-surface coupling part 15 since the size of the chip area increases and the manufacturing cost accordingly increases. Also, this is because it is considered that, as long as the multimode optical waveguide 40 is placed on a position within the range of allowable angles that are larger than the beam divergence angle θ, influence of the stray light can be avoided sufficiently, even if the distance between the end-surface coupling part 15 and the multimode optical waveguide 40 is short. In this manner, regarding positioning of the multimode optical waveguide 40, a standard for an allowable distance from a position of the spot size converter 10 should be established.

Figure 2:
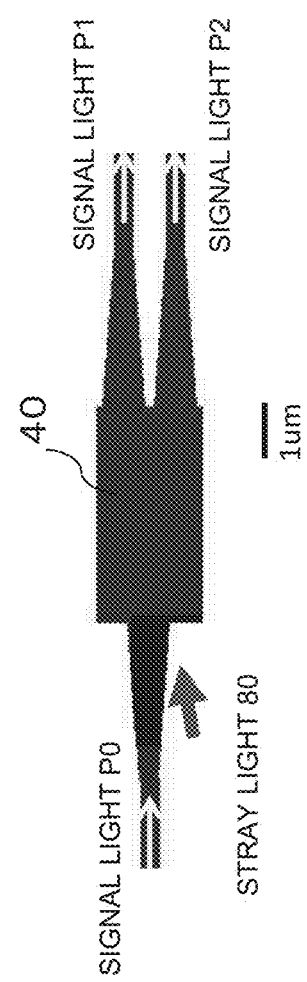
FIG. 2 is a schematic diagram for explaining a situation that stray light slips into a specific optical element of an optical integrated circuit according to a prior art technique.
Figure 3:
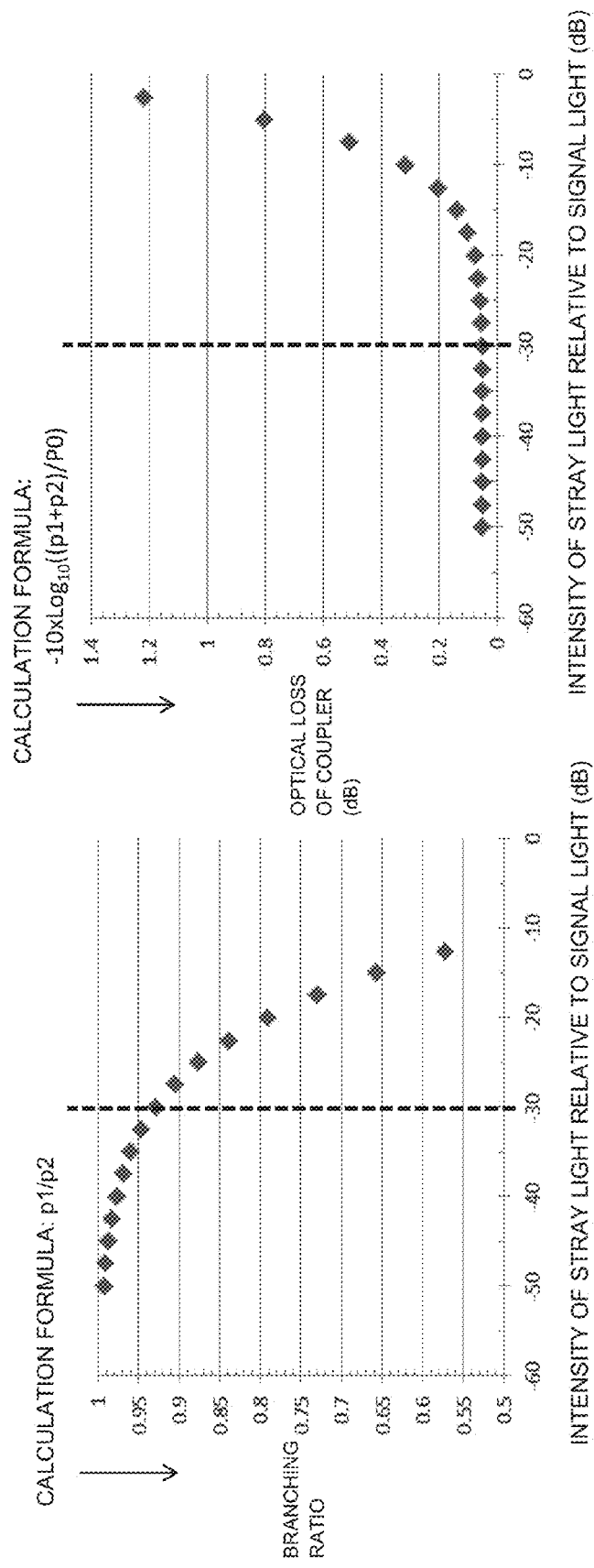
FIG. 3 shows graphs for explaining influence of stray light on a specific optical element in respective embodiments of the optical integrated circuit according to the present invention.

Accordingly, an explanation relating to setting of the reference for the "allowable distance r" will be provided. Preferably, it is preferable to define the reference for the allowable distance r in connection with intensity of the signal light. That is, for example, in the waveguiding direction of the signal light at the end-surface coupling part 15, a distance $r_c$ that makes the relative intensity of the stray light, such as that explained with reference to FIGS. 2 and 3, in relation to the intensity of the signal light at the multimode optical waveguide 40 to be −30 dB may be set to be the reference.

Specifically, it is considered that, at the end-surface coupling part 15, the stray light exists within a circular region (an area of $\pi w^2/4$) having a diameter of approximately "w" (a spot size at the end-surface coupling part), and, at a point located at a distance of r that the stray light has propagated, the stray light expands to have a rectangular shape having a height of $T_{box} + T_{clad}$ and a width of 2rθ (an area of $2r\theta \ast (T_{box} + T_{clad})$). In such a case, at the point located at the distance of r that the stray light has propagated, average intensity I(r) of the stray light can be represented as follows.

$$I(r) \approx I_0(\pi w^2/8r\theta(T_{box}+T_{clad}))$$ [Formula 6]

($I_0$ is average intensity of the stray light at the end-surface coupling part 15 (r=0).)

When matters such that a typical value of an optical loss at the spot size converter 10 is equal to or less than 3 dB, and that stray light having intensity that is approximately the same as intensity of signal light is generated at the end-surface coupling part 15 are taken into consideration, the propagation distance $r_c$ that makes the stray light intensity in relation to the signal light intensity to be −30 dB can be calculated tangibly as follows.

$$(\pi w^2/(8r_c\theta(T_{box}+T_{clad}))=0.001 \leftrightarrow r_c=\pi w^2/(0.001\times 8\theta(T_{box}+T_{clad}))=3062 \ \mu m$$ [Formula 7]

Note that, in the above calculation, it is set that w=3 μm, λ=1.3 μm, $T_{box}$=3 μm, $T_{clad}$=3.18 μm, and θ=10.7 (degrees)=0.187 (radians).

By taking the above into consideration, the placing area Z1 (the shaded part of FIG. 6) of the multimode optical waveguide element 40 concerning the position of the spot size converter 10 can be determined tangibly. Mathematical formulas for determining the placing area Z1 can be represented by two formulas, i.e., the above formula (2) and the following formula.

[Formula 8]

$$((x_m-x_s)^2+(y_m-y_s)^2)^{1/2}<r \quad (4)$$

Note that, in the case of a multichannel-type optical integrated circuit such as that shown in FIG. 7, at least one multimode optical waveguide element (($x_{m1}$, $y_{m1}$) in this case) may be placed within the range of the above allowable distance r, in relation to a corresponding end-surface coupling part (($x_{s1}$, $y_{s1}$) in this case).

FIG. 6 will be referred to again. By the way, the spot size converter 10 and the multimode optical waveguide element 40 are connected respectively by both end parts of an optical waveguide 300 that has a curved part 350 as a curved waveguide; and signal light optically coupled from the external optical circuit 20 is guided by the optical waveguide 300. The optical waveguide 300 extends linearly from the spot size converter 10 and in the waveguiding direction of the signal light at the spot size converter 10 (the y axis direction), and starts curving at a curving starting position of the curved part 350 (($x_g$, $y_g$), provided that $x_s=x_g$) and continues curving for approximately a quarter of a circumference.

It is preferable to provide the optical waveguide 300 in such a manner that the waveguiding direction of the signal light at the spot size converter (the y direction in this case) and the waveguiding direction of the entering signal light at the multimode optical waveguide element 40 (the x direction in this case) are made to be approximately orthogonal with each other. By this construction, deterioration of characteristics of the multimode optical waveguide element can be further suppressed.

It is preferable to determine the curving starting position of the curved part 350 of the optical waveguide 300 in connection with the previously explained specific point where the amount of the stray light decreases. That is, it is preferable to position the curving starting position of the curved part 350 of the optical waveguide 300 on the specific point that is on the line of the waveguiding direction of the signal light at the end-surface coupling part and where the amount of the stray light decreases. This is because, in the case that the stray light enters at the curving starting position, an unexpected optical loss will be incurred at the curving starting position due to interference between the signal light and the stray light. By carrying out positioning as explained above, effect of the stray light at the curving starting position can be minimized.

Note that, in the case of a multichannel-type optical integrated circuit such as that shown in FIG. 7, the waveguiding direction of the signal light at a position of at least one end-surface coupling part and the waveguiding direction of the signal light at the position of the corresponding multimode optical waveguide element may be made to be approximately orthogonal with each other, and the curving starting position of at least one curved part may be set to be positioned on the specific point that is on the line of the waveguiding direction at the corresponding end-surface coupling part and where the amount of the stray light decreases.

Second Embodiment

Figure 8:
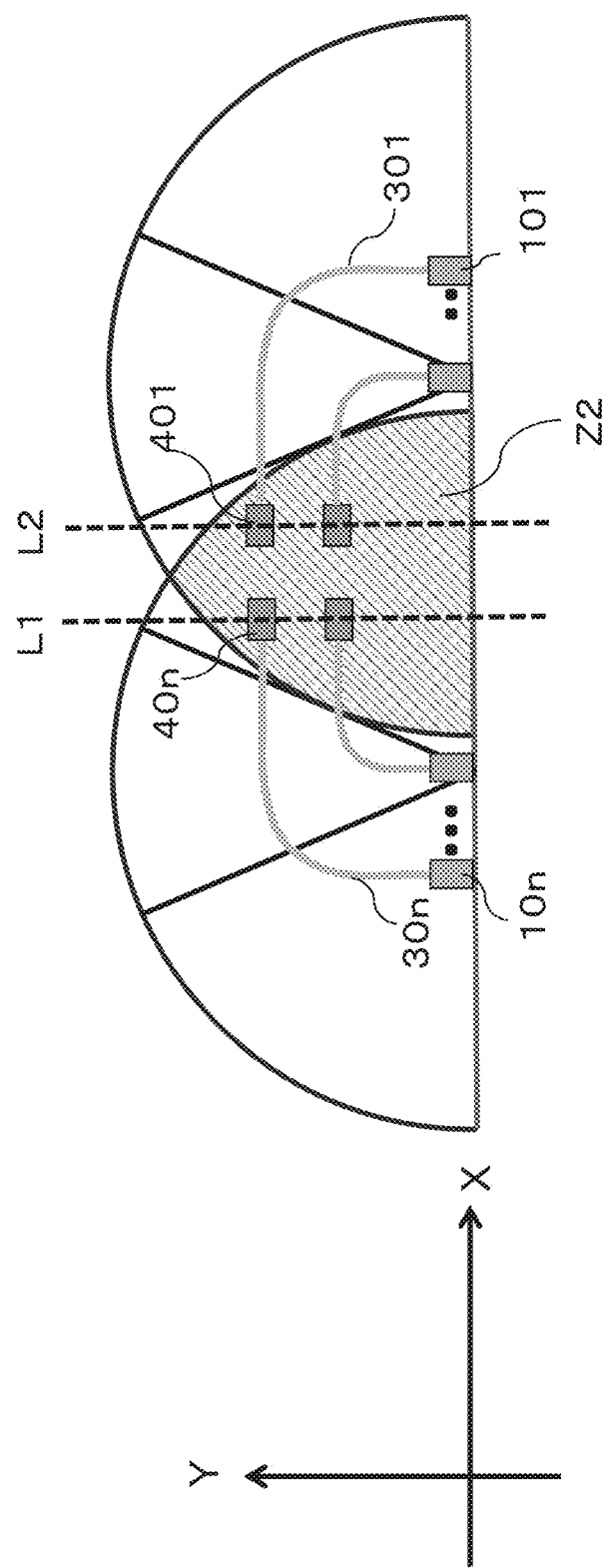
FIG. 8 is a schematic diagram showing a placing area for appropriately placing multimode optical waveguide elements in connection with positions of spot size converters, in a multichannel-type optical integrated circuit according to a second embodiment of the present invention.
Figure 9:
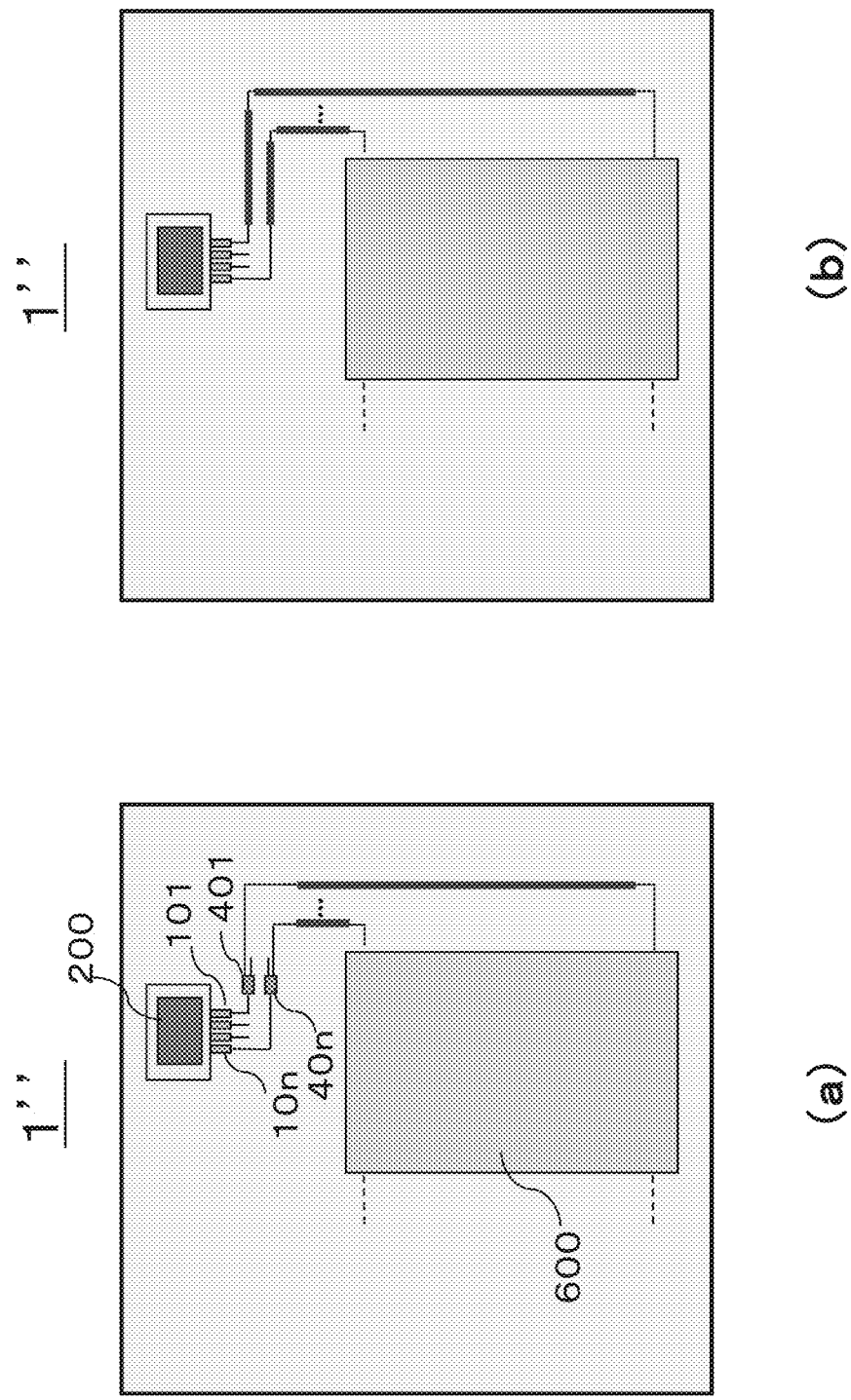
FIG. 9 shows schematic diagrams of examples of arrangement of optical elements on planes of circuits in the multichannel-type optical integrated circuits according to the second embodiment of the present invention.

FIG. 8 is a schematic diagram showing a placing area Z2 for placing multimode optical waveguide elements in connection with positions of spot size converters, in a multichannel-type optical integrated circuit 1" according to a second embodiment of the present invention.

The multichannel-type optical integrated circuit according to the second embodiment comprises n (n≥2) optical waveguides 301-30n that include curved parts. N spot size converters 101-10n, each of which is connected to one end of each optical waveguide, are coupled to an external optical circuit (not shown in the drawing) by carrying out end-surface coupling to optically couple n pieces of signal light from the external optical circuit to input them into the optical waveguides 301-30n, respectively. Further, the multichannel-type optical integrated circuit comprises n multimode optical waveguide elements 401-40n, each of which is connected to another end of each of the optical waveguides 301-30n and is configured to be placed within the placing area Z2.

The placing area Z2 is determined, on the plane of the optical integrated circuit, on the basis of m areas z[1]-z[m] that are determined based on relationships between respective positions ($x_{si}$, $y_{si}$) (1≤i≤m) of m (1≤m≤n) arbitrary spot size converters selected from n spot size converters 101-10n and respective positions ($x_{mi}$, $y_{mi}$) of corresponding multimode optical waveguide elements.

That is, according to the explanation of the above first embodiment, each of the m (1≤i≤m) areas can be determined based on the following two formulas.

[Formula 9]

$$((x_{mi}-x_{si})^2+(y_{mi}-y_{si})^2)^{1/2}<r \quad (5)$$

and

[Formula 10]

$$|x_{mi}-x_{si}|>|y_{mi}-y_{si}|\tan\theta \quad (6)$$

Regarding the "beam divergence angle θ" and the "allowable distance r," since they are similar to those previously explained in relation to the first embodiment, explanations thereof will be abbreviated in this section.

In FIG. 8, it is set that M=2; and the placing area Z2 is determined to be an overlapping area where two areas z[1] and z[2] overlap with each other. In this regard, a person skilled in the art would understand that an area such as the area Z2 is not limited to an overlapping area.

In the second embodiment, within the placing area Z2, n multimode optical waveguide elements 401-40n are aligned. Note that, similar to the case of the first embodiment, it is preferable to provide the optical waveguides 301-30n in such a manner that the waveguiding direction of the signal light at each of the spot size converters 101-10n (the y direction in this case) and the waveguiding direction of the entering signal light at the multimode optical waveguide elements 401-40n (the x direction in this case) are made to be approximately orthogonal with each other. In the second embodiment, it is possible to align and place the multimode optical waveguide elements 401-40n on one or more lines of the wave-guiding directions of the signal light at the spot size converters (the y direction). In the example of FIG. 8, M=2 and, thus, the multimode optical waveguide elements 401-40n are aligned on two lines L1 and L2 in the y direction.

(Examples of Placement of Optical Elements on Planes of Optical Circuits)

FIGS. 9-12 show schematic diagrams of some examples of arrangement of optical elements on planes of circuits in the multichannel-type optical integrated circuits 1" according to the second embodiment of the present invention. Note that, in (a) of FIG. 9 and (a) of FIG. 10, MMI couplers are adopted as the multimode optical waveguide elements 401-40n, and, in (b) of FIG. 9, (b) of FIG. 10, FIG. 11, and FIG. 12, wide-width waveguides are adopted as the multimode optical waveguide elements 401-40n. Further, in FIGS. 9-12, multichannel-type semiconductor lasers are adopted as external optical circuits 200. In addition, the multichannel-type optical circuits in FIGS. 9-12 comprise modulators 600 as optical elements. However, it should be understood by a person skilled in the art that the end-surface optical-coupling-type silicon optical integrated circuit of the present invention is not limited by the constructions of these semiconductor lasers and modulators. Also, although it is needless to stare, and as a matter of course, these examples of arrangement are applicable in the construction of the first embodiment.

As shown in FIGS. 9-12, regarding waveguiding directions of the signal light at the spot size converters 101-10n, four directions, that is, upward, downward, left, and right, should be considered. Specifically, FIG. 9 concerns a downward direction, FIG. 10 concerns a right direction, FIG. 11 concerns an upward direction, and FIG. 12 concerns a left direction.

A case that the waveguiding direction of the signal light is the same as the direction of propagation of the stray light 80 in the plane of the optical integrated circuit is to be considered. In such a case, preferably, it is preferable to place the spot size converters 101-10n in such a manner that they are placed on places near a corner part of the chip of the optical integrated circuit 1", and that the directions of the signal light at the spot size converters 101-10n (that is, the direction of propagation of the stray light 80) are oriented toward one of the chip's sides that form the corner part of the chip. This is because, by the above construction, the stray light 80 can be radiated efficiently to the outside of the chip.

Figure 10:
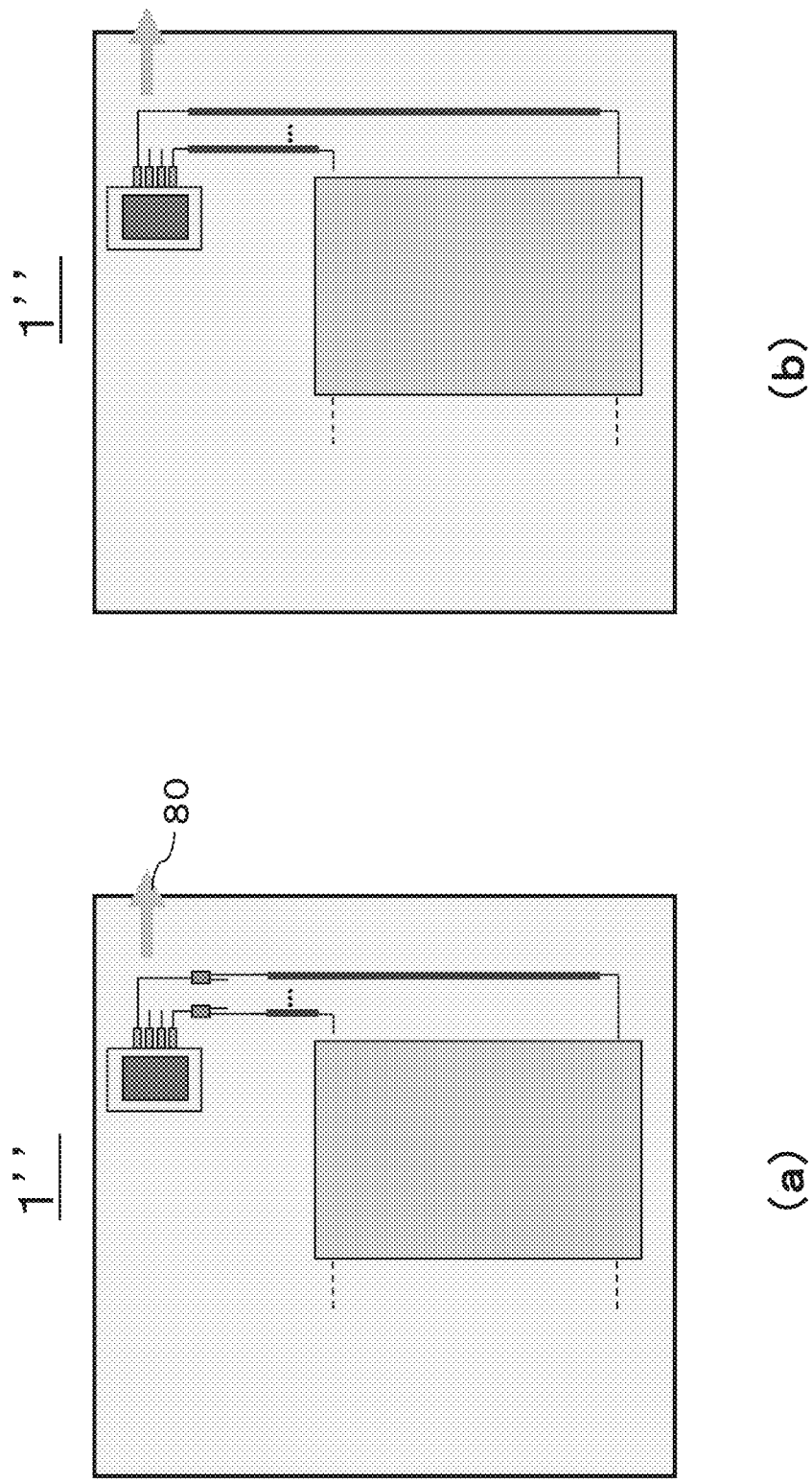
FIG. 10 shows schematic diagrams of other examples of arrangement of optical elements on planes of circuits in the multichannel-type optical integrated circuits according to the second embodiment of the present invention.
Figure 11:
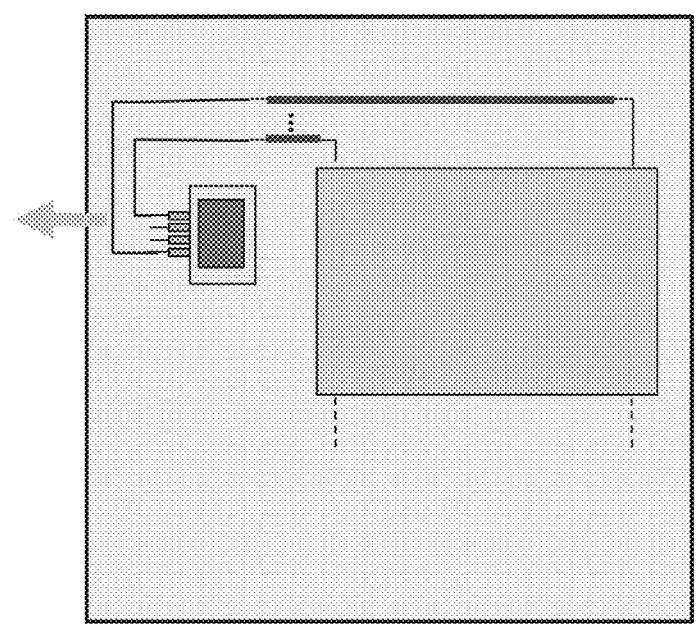
FIG. 11 shows schematic diagrams of other examples of arrangement of optical elements on planes of circuits in the multichannel-type optical integrated circuits according to the second embodiment of the present invention.
Figure 12:
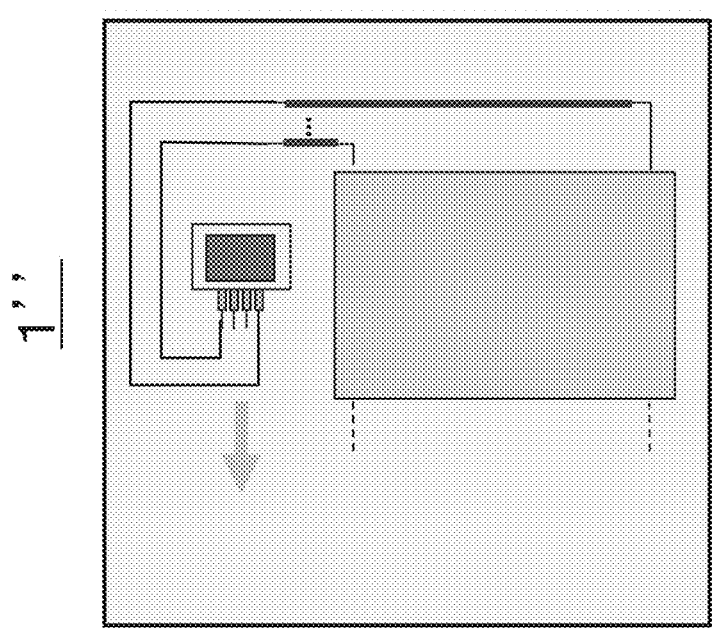
FIG. 12 shows schematic diagrams of other examples of arrangement of optical elements on planes of circuits in the multichannel-type optical integrated circuits according to the second embodiment of the present invention.

For example, in the case that the external optical circuit 200 is placed on a place near the chip's upper right corner part on the plane of the optical integrated circuit as shown in each of FIGS. 9-12, it is especially preferable to place the external optical circuit 200 on a place near a chip's side that form the chip's upper right corner, i.e., chip's top-side side or a chip's right-side side, in such a manner that the signal light is outputted from each of the spot size converters 101-10n along the direction that is approximately orthogonal to the side as shown in each of FIGS. 10 and 11, so as to achieve a construction that efficiently radiates the stray light to the outside of the chip. Note that, in the cases of the constructions of arrangements of FIGS. 11 and 12, each optical waveguide would be formed to have a multi-stage curving construction that comprises plural curved parts. Also, although the positions of the multimode optical waveguide elements are located on the back of the end-surface coupling parts (in a direction opposite to the waveguiding direction of the entering signal light), the multimode optical waveguide elements are placed on the basis of an area defined by the formulas (2) and (4) or the formulas (5) and (6), even in such a case. That is, in the formulas (2) and (4) or the formulas (5) and (6), $y_m < y_s$ or $y_{mi} < y_{si}$ may be possible. By this construction, effect of the stray light, that is reflected at the end-surface coupling parts and radiated behind the end-surface coupling parts, can be avoided also. Further, in the case that the external optical circuit is a semiconductor laser, although laser light may be emitted along a direction opposite to the waveguiding direction of the entering signal light in some cases, effect of stray light generated due to the above can be avoided also.

In the above, the present invention has explained in detail with reference to the drawings; however, the above explanation has been provided merely for the purpose of exemplification, and it is intended that the above explanation does not limit the characteristic of the present invention. The above explanation has been provided merely for showing and explaining preferred embodiments, and all of modifications and changes within the scope of the technique of the present invention should be protected.

REFERENCE SIGNS LIST 1, 1', 1": Optical integrated circuit
2: Circuit substrate
3: $SiO_2$ buried oxide film (BOX layer)
4: Si core layer
5: Top clad layer
10, 10', 101-10n: Spot size converter
15, 15': End-surface coupling part
20, 200: External optical circuit
30, 45: Optical waveguide
301-30n: Optical waveguide
35: Curved part
40, 40', 401-40n: Multimode optical waveguide element
50, 501-50n: Wide-width optical waveguide
60, 600: Optical modulator
80: Stray light
Z1, Z2: Area to place a multimode optical waveguide element

The invention claimed is:

1. An optical integrated circuit which is formed on the basis of a $SiO_2$ buried oxide film layer stacked on a substrate in a laminating manner, a Si core layer stacked on the $SiO_2$ buried oxide film layer in a laminating manner, and a top clad layer stacked on the Si core layer in a laminating manner and having an index of refraction lower than that of Si;

wherein the optical integrated circuit comprises one or more end-surface coupling parts for connecting to an external optical circuit, wherein signal light is inputted to each of one or more optical waveguides that include curved parts, and wherein, on a plane of the optical integrated circuit, a position $(x_s, y_s)$ of one of the end-surface coupling parts selected from arbitrary ones and a position $(x_m, y_m)$ of an arbitrary multimode optical waveguide element to which each of the optical waveguides is coupled via each of the curved parts satisfy a relationship $|x_m - x_s| > |y_m - y_s| \tan \theta$;

wherein $\theta = \arcsin(\lambda/(\lambda^2 + (\pi^2 n^2 w^2)/4)^{1/2})$, and

"$\lambda$" denotes a wavelength of the signal light and "w" denotes a spot size at the end-surface coupling part; and, in the case that an index of refraction of light of the SiO$_2$ buried oxide film layer is represented by "$n_{box}$," an index of refraction of light of the top clad layer is represented by "$n_{clad}$," a thickness of the SiO$_2$ buried oxide film layer is represented by "$T_{box}$," and a thickness of the top clad is represented by "$T_{clad}$," n is determined as $-n \approx (n_{box} T_{box} + n_{clad} T_{clad})/(T_{box} + T_{clad})$, wherein a curving starting position of at least one curved part on the plane of the optical integrated circuit is a point on a line of a waveguiding direction of the signal light at the corresponding end-surface coupling part, and the point is determined from a distribution of stray light intensity that is formed as a result that stray light is repeatedly reflected by a bottom surface of the SiO$_2$ buried oxide film layer and a top surface of the top clad layer and propagates therebetween on reflection paths, as being located at one of the parts that are not included in the reflection paths of the stray light.

2. The optical integrated circuit according to claim 1, wherein each of the end-surface coupling parts is formed by use of a spot size converter, and coupled to the external optical circuit and the optical waveguide respectively.

3. The optical integrated circuit according to claim 1, wherein a waveguiding direction of the signal light at a position of at least one end-surface coupling part and a waveguiding direction of the signal light at a position of the corresponding multimode optical waveguide element are made to be approximately orthogonal with each other.

4. The optical integrated circuit according to claim 1, wherein the top clad layer is a SiO$_2$ top clad layer.

5. The optical integrated circuit according to claim 1, wherein the multimode optical waveguide element is a MMI coupler element.

6. The optical integrated circuit according to claim 1, wherein the multimode optical waveguide element is a multimode optical waveguide.

7. The optical integrated circuit according to claim 1, wherein at least one of the multimode optical waveguide elements is further placed within a range of a predetermined allowable distance, that is defined in connection with intensity of the signal light, from the corresponding end-surface coupling part.

8. The optical integrated circuit according to claim 1, wherein the external optical circuit is a semiconductor laser.

9. The optical integrated circuit according to claim 1, wherein the optical integrated circuit further comprises:

n (n≥2) of the optical waveguides that include curved parts respectively;

n spot size converters coupled to one ends of the optical waveguides, wherein end-surface coupling is carried out to couple the n spot size converters respectively to an external optical circuit for optically coupling signal light from the external optical circuit and inputting it into the optical waveguide; and n multimode optical waveguide elements coupled to other ends of the optical waveguides respectively, wherein, on the plane of the optical integrated circuit, each of the n multimode optical waveguide elements is placed within a placing area that is determined based on m areas that are determined by formulas $((x_{mi} - x_{si})^2 + (y_{mi} - y_{si})^2)^{1/2} < r$, and $|x_{mi} - x_{si}| > |y_{mi} - y_{si}| \tan \theta$ that are based on respective positions $(x_{si}, y_{si})$ (1≤i≤m) of m (1≤m≤n) arbitrary spot size converters selected from the n spot size converters and respective positions $(x_{mi}, y_{mi})$ of corresponding multimode optical waveguide elements;

wherein $\theta = \arcsin \lambda/\lambda^2 + (\pi^2 n^2 w^2/4)^{1/2}$, and

"r" denotes a predetermined value.

10. The optical integrated circuit according to claim 9, wherein M=2, and the placing area determined based on two areas is an overlapping area in the two areas.

11. The optical integrated circuit according to claim 9, wherein the n multimode optical waveguide elements are aligned and placed on one or more lines of waveguiding directions of the signal light at the spot size converters.

12. The optical integrated circuit according to claim 9, wherein the spot size converters are placed in such a manner that they are placed on places near a corner part of a chip of the multichannel-type optical integrated circuit, and that the waveguiding directions of the signal light at positions of the spot size converters are oriented toward one of the chip's sides that form the corner part of the chip.

* * * * *